(12) United States Patent
Clarke

(10) Patent No.: US 9,056,991 B2
(45) Date of Patent: Jun. 16, 2015

(54) POLYMERIC PIGMENT SYSTEMS AND METHODS

(75) Inventor: Heather E. Clarke, Lancaster, MA (US)

(73) Assignee: Cabot Corporation, Boston, MA (US)

( * ) Notice: Subject to any disclaimer, the term of this patent is extended or adjusted under 35 U.S.C. 154(b) by 370 days.

(21) Appl. No.: 13/812,902

(22) PCT Filed: Jul. 29, 2011

(86) PCT No.: PCT/US2011/045861
§ 371 (c)(1),
(2), (4) Date: Jan. 29, 2013

(87) PCT Pub. No.: WO2012/016125
PCT Pub. Date: Feb. 2, 2012

(65) Prior Publication Data
US 2013/0123426 A1 May 16, 2013

Related U.S. Application Data

(60) Provisional application No. 61/400,598, filed on Jul. 30, 2010.

(51) Int. Cl.
C09D 11/02 (2014.01)
B41M 1/00 (2006.01)
C09D 11/102 (2014.01)
C09D 11/326 (2014.01)

(52) U.S. Cl.
CPC .............. C09D 11/102 (2013.01); B41M 1/00 (2013.01); C09D 11/326 (2013.01)

(58) Field of Classification Search
CPC .... C09D 11/30; C09D 11/102; C09D 11/326; C09D 17/005; C09D 175/04; B41M 1/00
USPC ....................................................... 523/160
See application file for complete search history.

(56) References Cited

U.S. PATENT DOCUMENTS

| 3,412,054 A | 11/1968 | Milligan et al. |
| 3,479,310 A | 11/1969 | Dieterich et al. |
| 3,905,929 A | 9/1975 | Noll |
| 3,920,598 A | 11/1975 | Reiff et al. |
| 4,108,814 A | 8/1978 | Reiff et al. |
| 4,190,566 A | 2/1980 | Noll et al. |
| 4,408,008 A | 10/1983 | Markusch |
| 4,701,408 A | 10/1987 | Koestler |
| 4,922,007 A | 5/1990 | Kieczykowkski et al. |
| 5,554,739 A | 9/1996 | Belmont |
| 5,630,868 A | 5/1997 | Belmont et al. |
| 5,698,016 A | 12/1997 | Adams et al. |
| 5,707,432 A | 1/1998 | Adams et al. |
| 5,837,045 A | 11/1998 | Johnson et al. |
| 5,851,280 A | 12/1998 | Belmont et al. |
| 5,885,335 A | 3/1999 | Adams et al. |
| 5,895,522 A | 4/1999 | Belmont et al. |
| 5,900,029 A | 5/1999 | Belmont et al. |
| 5,922,118 A | 7/1999 | Johnson et al. |
| 5,990,245 A | 11/1999 | Esselborn et al. |
| 6,042,643 A | 3/2000 | Belmont et al. |
| 6,248,839 B1 | 6/2001 | Esselborn et al. |
| 6,337,358 B1 | 1/2002 | Whitehouse et al. |
| 6,660,075 B2 | 12/2003 | Bergemann et al. |
| 6,723,783 B2 | 4/2004 | Palumbo et al. |
| 6,831,194 B2 | 12/2004 | Srinivas |
| 8,759,418 B2 * | 6/2014 | Li et al. ..................... 523/160 |
| 2001/0036994 A1 | 11/2001 | Bergemann et al. |
| 2003/0101901 A1 | 6/2003 | Bergemann et al. |
| 2003/0184629 A1 | 10/2003 | Valentini et al. |
| 2005/0020730 A1 | 1/2005 | Valentini et al. |
| 2007/0100024 A1 | 5/2007 | Gu et al. |
| 2008/0207811 A1 | 8/2008 | Brust et al. |
| 2008/0318009 A1 | 12/2008 | Berge et al. |
| 2009/0169748 A1 | 7/2009 | House et al. |

FOREIGN PATENT DOCUMENTS

| CA | 2351162 | 12/2001 |
| KR | 10-2006-0055257 | 5/2006 |
| WO | WO2004/063289 | 7/2004 |

OTHER PUBLICATIONS

International Search Report and the Written Opinion of the International Searching Authority, or the Declaration for International Application No. PCT/US2011/045861, mailed on Apr. 6, 2012.
Kieczykowski et al., J. Org. Chem, 1995, 60, 8310-8312.
N. Tsubokawa, Prog. Polym. Sci., 17, 417, 1992.
International Preliminary Report on Patentability (Chapter 1 of the Patent Cooperation Treaty) received in International Application No. PCT/US2011/045861, mailed on Feb. 14, 2013.

* cited by examiner

*Primary Examiner* — Nathan M Nutter

(57) ABSTRACT

A composition useful as an inkjet ink is described as well as methods of making the composition. The composition includes a pigment and a polymer and the polymer may include a polyurethane. The composition exhibits properties that make it useful in thermal and piezo inkjet applications.

16 Claims, 2 Drawing Sheets

POLYMERIC PIGMENT SYSTEMS AND METHODS

This application is a national phase application under 35 U.S.C. §371 of International Application Number PCT/US2011/045861, filed on Jul. 29, 2011, which claims priority to U.S. Provisional Patent Application No. 61/400,598, filed on Jul. 30, 2010, the disclosure of which is incorporated herein by reference.

TECHNICAL FIELD

The invention relates pigment systems and, in particular, to pigment systems for use as inkjet inks.

BACKGROUND

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions which can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 g/mol in order to maintain solubility and therefore pigment stability.

Modified pigments have also been developed which provide ink compositions with improved properties, such as dispersibility, without the need for an external dispersant. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like. These modified pigments provide inkjet inks with good overall properties.

Polymers other than dispersants have also been incorporated into inkjet ink compositions in an effort to improve performance. For example, emulsion polymers or latexes, which are typically high in molecular weight, have been used as an additive to improve the print performance of inkjet inks. However, as emulsion polymers, these polymers are not soluble and would tend to lead to difficulties in printing, particularly nozzle clogging.

SUMMARY

In one aspect an inkjet composition is provided, the composition comprising an aqueous vehicle, a self-dispersed pigment, and a polyurethane polymer wherein at least 5 percent by weight of the polyurethane polymer is associated with the self-dispersed pigment and at least 5 percent by weight of the polyurethane polymer is unassociated with the self-dispersed pigment. In some embodiments at least 10 percent of the polyurethane polymer is hydrophilic. The composition may be a thermal inkjet composition and may contain both dispersed and dissolved polyurethane entities and in some embodiments at least 10% of the self-dispersed pigment may be associated with the polymer while at least 10 percent may be unassociated with the polymer. The self-dispersed pigment may comprise an appended organic group that may be at least one geminal bisphosphonic acid group, or salt or ester thereof, and may have a calcium index value greater than that of phenylphosphonic acid. The pigment may comprise a carbon black and the pigment may be a color pigment. The polyurethane may be the product of a diol and an isocyanate, the diol being selected from one or more polyethers and/or polyesters. The diol may have a molecular weight in the range of 1,000 to 20,000. The polyurethane polymer may be present as dispersed particles, as a soluble entity in solution and as an entity associated with the pigment.

In another aspect a method of making an inkjet composition is provided, the method comprising combining a polyurethane pre-polymer with an aqueous self-dispersed pigment dispersion to produce a mixture, polymerizing at least a portion of the polyurethane pre-polymer in the mixture to form a polyurethane polymer, and forming an inkjet composition comprising an aqueous vehicle, a pigment, and a polyurethane polymer wherein at least some of the polyurethane polymer is associated with the pigment and at least some of the polyurethane polymer is unassociated with the pigment. The inkjet composition may be a thermal inkjet composition or a piezo inkjet composition and in some embodiments may be essentially free of non-aqueous solvents. A composition is essentially free of a substance if the substance is absent or is present only in amounts that don't affect the performance of the composition. The self-dispersed pigment may be a carbon black that includes an appended organic group. The self-dispersed pigment may include at least one geminal bisphosphonic acid group, or salt or ester thereof and may have a calcium index value greater than that of phenylphosphonic acid. After aging for four days at 80° C., the viscosity of the composition may change by less than 10% and the average particle size may change by less than 10%. The polyurethane polymer may be formed from a diol and an isocyanate, the isocyanate selected from toluene diisocyanate, hexamethylene diisocyanates, m-tetramethyl xylene diisocyanate and methylene diphenyl diisocyanate. The diol may include a higher molecular weight diol and a lower molecular weight stabilizing diol.

In another aspect a method is provided, the method comprising mixing a polyurethane pre-polymer with a self-dispersed pigment to form a mixture, polymerizing the pre-polymer in the mixture to form a polyurethane polymer, and associating at least some of the polyurethane polymer with the dispersed pigment. The method may include adding the pigment in a dry form to a non-aqueous pre-polymer solution, mixing an aqueous dispersion of the pigment with a pre-polymer solution, and/or removing a non-aqueous solvent from the mixture. In one set of embodiments at least some of the polyurethane polymer is unassociated with the pigment. The method may include associating the polyurethane polymer to the self-dispersed pigment via at least one of ionic attachment, ion-ion, ion-H-bonding, ion-dipole, vanderWaal's and H-bonding. The method may produce both hydrophilic and hydrophobic polyurethane entities. An ink vehicle may be added to produce a thermal inkjet ink.

In another aspect, an ink jet composition is provided, the ink jet composition comprising a liquid vehicle, greater than 10% solids, greater than 4% pigment and greater than 2% polyurethane polymer, wherein the inkjet composition exhibits a change in viscosity of less than +/−10% when aged for 4 days at 80° C. The composition may have a viscosity between 2.0 and 4.0 cP.

In another aspect an inkjet composition is provided, the composition comprising a liquid vehicle, greater than 10% solids, greater than 4% pigment, and greater than 2% polyurethane, wherein the inkjet dispersion exhibits a change in particle size of less than +/−10% when aged for 4 days at 80° C. The composition may have a viscosity between 2.0 and 4.0 cP.

In another aspect a thermal inkjet ink is provided, the inkjet ink capable of forming an image on paper using a thermal inkjet printer wherein the image has an optical density of greater than 1.40 and HLS smearfastness of less than 0.10 at 5 minutes after printing.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1A:
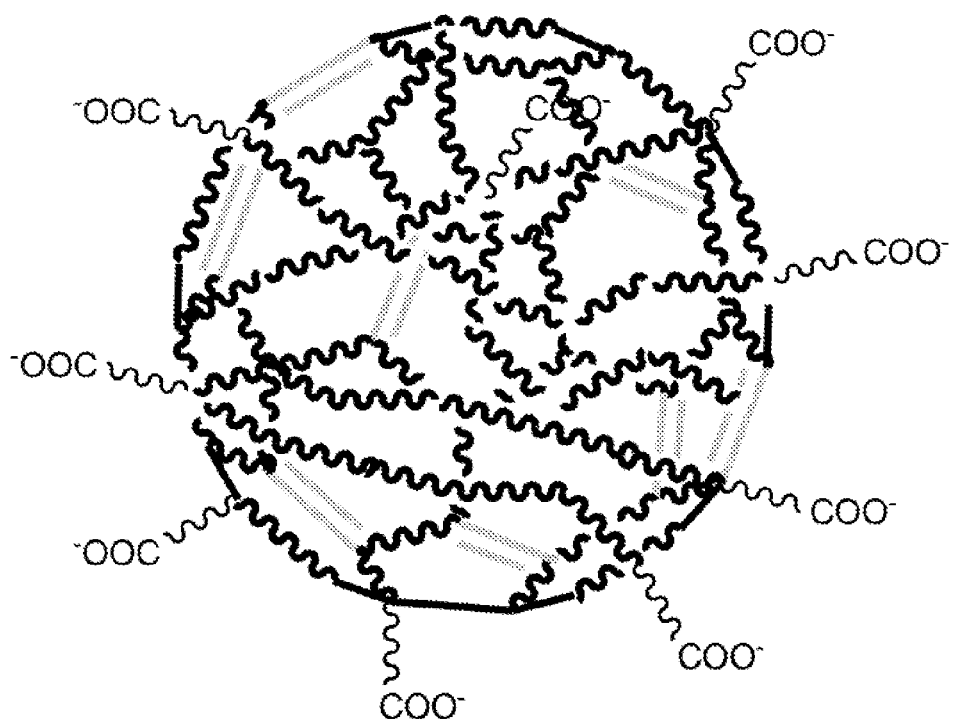
FIG. 1A provides a structural representation of one form of a polyurethane particle.

In one aspect, this disclosure describes polymer containing ink jet dispersions that, when compared to known polymer containing dispersions, can provide equal or superior smear resistance while improving properties such as, for example, jettability, droplet size, viscosity, stability and optical density.

In one set of embodiments an inkjet composition is described that includes a colorant and a polymer in a liquid vehicle. The colorant may be a pigment and the polymer may include one or more polyurethanes. The composition can be an aqueous dispersion that can exhibit, for example, long term stability, good jetting properties, high optical density and/or improved durability. For instance, a composition having greater than 10% solids may retain its viscosity and/or particle size within a +/−10% window after high temperature age testing.

In one set of embodiments the polyurethane may be present as dispersed polymeric particles, dissolved polyurethane molecules, or may be associated with one or more pigments. In some embodiments the polyurethane may be present as any two or all three of these entities. Excellent thermal injket printing results have been achieved using dispersions that contain, simultaneously, both polyurethane that is associated with a pigment and polyurethane that is unassociated with the pigment. Such dispersion compositions can be produced by chain extending polyurethane pre-polymer in a mixture containing a self-dispersed pigment. The compositions may include both a dispersed pigment and dispersed polyurethane and may have a solids content of greater than 10%. The pigment may be present at greater than 2%, greater than 4%, greater than 6% or greater than 8% by weight. The polymer may be present at greater than 1%, greater than 2%, greater than 3% or greater than 4%, by weight. This dispersion may be stable for months or years, and inkjet inks may be made from the dispersion in a single dilution step. This may avoid having to combine pigment dispersions and polymer dispersions at the time of inkjet ink formulation.

Inkjet dispersions including dispersed polyurethane polymer particles can be made by mixing a dispersion of polyurethane polymer particles with a pigment dispersion to produce a composition including both dispersed pigment and dispersed polyurethane particles. These compositions have been shown to improve print durability over inkjet dispersions that do not contain polyurethane. However, as described herein, an alternative composition made by polymerizing a polyurethane pre-polymer in the presence of a self-dispersed pigment can result in a polymer/pigment dispersion that exhibits a combination of durability, stability and jetting characteristics that may be superior to compositions made by mixing a prepared polyurethane polymer dispersion with a pigment dispersion.

In general, inkjet ink printing is a method that involves ejecting or propelling small droplets of an ink composition from a cartridge through tiny holes (nozzles) onto a substrate to form an image. The drops are very small, for example less than 50 picoliters, from 10-20 picoliters or from 20-40 in size, and it is often very difficult to provide an ink that is stable enough to be reliably jetted through these nozzles without clogging them, along with producing a printed image with desirable properties. Various methods for jetting the droplets have been developed. For example, thermal inkjet printing involves running a pulse of current through small electrically heated elements causing a steam explosion in the chamber that forms a bubble, which propels a droplet of ink onto the paper. Also, ink may be jetted using a piezoelectric material instead of a heating element. The piezomaterial changes shape or size, which generates a pressure pulse in the ink, forcing a droplet of ink out from the nozzle. While both techniques operate via a similar mechanism, the method by which the droplet is produced is very different, and, as a result, the requirements for the ink compositions are also different. For example, in thermal inkjet printing, a process called kogation results from the thermal formation of a coating on the heating element. This results in poor print quality due to poor firing of the nozzles. Since piezoelectric printers do not use heating methods to generate the droplets, ink compositions which can be used in a piezo printer may not be compatible in a thermal printhead.

Many of the inkjet ink compositions described herein can be used in thermal inkjet ink applications. The liquid vehicle of the inkjet ink compositions can be either an aqueous or non-aqueous liquid vehicle, but is preferably a vehicle that contains water. The vehicle is preferably an aqueous vehicle, which is a vehicle that contains greater than 50% water by weight and can be, for example, water or mixtures of water with water miscible solvents such as alcohols. Thus, the thermal inkjet ink composition may be a thermal aqueous inkjet ink composition.

The pigment can be any type of pigment known by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or a black pigment, such as carbon black.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In some embodiments, the pigment may have a primary particle size of less than 200, less than 160 or less than 120 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Pigments prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

The pigment may be a modified pigment comprising a pigment having attached at least one organic group. The pigment can be any of those described above. The organic group may be directly attached. The modified pigment may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, 6,042,643 and 6,337,358, the descriptions of which are fully incorporated herein by reference. Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group, such as is described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The organic group of the modified pigment may be a group that enables the modified pigment to be dispersible in the vehicle without a separate dispersant. Preferably, the organic group attached to the pigment comprises at least one group having a high calcium index value. As used herein, the term "calcium index value" refers to a measure of the ability of a functional group to coordinate or bind calcium ions in solution. The higher the calcium index value, the more strongly or effectively the group can coordinate calcium ions. Such a value can be determined using any method known in the art. For example, the calcium index value may be measured using a method in which the amount of calcium coordinated by a compound in a standard solution containing soluble calcium ions and a color indicator is measured using UV-Vis spectroscopy. In addition, for compounds having a strong color, the calcium index value may be measured using an NMR method. Also, for some compounds, values measured using known literature techniques can be used. Details relating to specific methods are described below.

Also, as used herein, the term "high" in reference to the calcium index value means that the value is greater than that of a reference material. For the purposes of the present invention, the reference can be phenylphosphonic acid and in other embodiments 1,2,3-benzene tricarboxylic acid. Thus, in one set of embodiments the organic group attached to the pigment has a calcium index value that is greater than the calcium index value of phenyl phosphonic acid and in another set of embodiments has a calcium index value greater than that of 1,2,3-benzene tricarboxylic acid. The organic group may have a calcium index value greater than 2.8, greater than 3.0, or greater than 3.2, determined using UV-Vis spectroscopy, as described in more detail below. Suitable organic groups having these properties include those described in U.S. Patent Application Publication No. 2007/0100024, which is incorporated in its entirety by reference herein.

The attachment level of the organic group on the pigment should be adequate to provide for a stable dispersion of the modified pigment in the intended vehicle. Attachment levels are provided in terms of mols of organic group per surface area of pigment. For example, organic groups may be attached at a level of 0.1 to 10.0 μmol/m², 0.5 to 5.0 μmol/m², 1.0 to 3.0 μmol/m² or 1.2 to 2.0 μmol/m². These levels can be determined by methods known to those of skill in the art. For instance, if the organic group includes phosphorous, the amount of phosphorous associated with the pigment can be determined by elemental analysis.

The organic group of the modified pigment may include at least one geminal bisphosphonic acid group, partial esters thereof, or salts thereof—that is, the organic group may comprise at least two phosphonic acid groups, partial esters thereof, or salts thereof that are directly bonded to the same carbon atom. Such a group may also be referred to as a 1,1-diphosphonic acid group, partial ester thereof, or salt thereof. By "partial ester thereof" is meant that the phosphonic acid group may be a partial phosphonic acid ester group having the formula —$PO_3RH$, or a salt thereof, wherein R is an aryl, alkaryl, aralkyl, or alkyl group. Either or both of the phosphonic acid groups of the organic group may be a partial phosphonic acid ester group. Also, one of the phosphonic acid groups may be a phosphonic acid ester having the formula —$PO_3R_2$ while the other phosphonic acid group may be a partial phosphonic acid ester group, a phosphonic acid group, or a salt thereof. However, it is preferred that at least one of the phosphonic acid groups is either a phosphonic acid, a partial ester thereof, or salts thereof. By "salts thereof" is meant that the phosphonic acid group may be in a partially or fully ionized form having a cationic counterion. Either or both of the phosphonic acid groups of the organic group may be in either a partially or fully ionized form. Thus, the organic group may comprise at least one geminal bisphosphonic acid group, wherein either or both phosphonic acid groups have the formula —$PO_3H_2$, —$PO_3H^-M^+$ (monobasic salt), or —$PO_3^{-2} M^{+2}$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group. Preferably, at least one of the phosphonic acid groups, and more preferably, both phosphonic acid groups of the geminal bisphosphonic acid group are phosphonic acid groups or salts thereof.

For example, the organic group may comprise a group having the formula —$CQ(PO_3H_2)_2$, partial esters thereof, or salts thereof. Q is bonded to the geminal position and may be H, R, OR, SR, or $NR_2$ wherein R, which can be the same or different, is H, a $C_1$-$C_{18}$ saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or $NR_2$, wherein R, which can be the same or different, is H, a C1-C6 alkyl group, or an aryl group. Preferably Q is H, OH, or $NH_2$. Furthermore, the organic group may comprise a group having the formula —$(CH_2)_n$—$CQ(PO_3H_2)_2$, partial esters thereof, or salts thereof, wherein Q is as described above and n is 0 to 9, such as 1 to 9. Preferably n is 0 to 3, such as 1 to 3, and more preferably, n is either 0 or 1. Also, the organic group may comprise a group having the formula —X—$(CH_2)_n$—$CQ(PO_3H_2)_2$, partial esters thereof, or salts thereof, wherein Q and n are as described above and X is an arylene, heteroarylene, alkylene, vinylidene, alkarylene, aralkylene, cyclic, or heterocyclic group. Preferably X is an arylene group, such as a phenylene, naphthalene, or biphenylene group, which may be further substituted with any group, such as one or more alkyl groups or aryl groups. When X is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups. X can be directly attached to the pigment, meaning there are no additional atoms or groups from the attached organic group between the pigment and X.

X can be further substituted with one or more functional groups. Examples of functional groups include, but are not limited to, R', OR', COR', COOR', OCOR', carboxylates, halogens, CN, NR'$_2$, $SO_3H$, sulfonates, sulfates, NR'(COR'), CONR'$_2$, imides, $NO_2$, phosphates, phosphonates, N=NR', SOR', NR'$SO_2$R', and $SO_2$NR'$_2$, wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In addition, the organic group may comprise a group having the formula —X-Sp-$(CH_2)_n$—$CQ(PO_3H_2)_2$, partial esters thereof, or salt thereof, wherein X, Q, and n are as described above. Sp is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR"$, —O—, —S—, —NR"—, —NR"CO—, —CONR"—, —NR"$CO_2$—, —$O_2$CNR"—, —NR"CONR"—, —N(COR")CO—, —CON(COR")—, —NR"COCH($CH_2CO_2R"$)— and cyclic imides therefrom, —NR"COCH$_2$CH($CO_2R"$)— and cyclic imides therefrom, —H($CH_2CO_2R"$)CONR"— and cyclic imides therefrom, —CH($CO_2R"$)$CH_2$CONR" and cyclic imides therefrom (including phthalimide and maleimides of these), sulfonamide groups (including —$SO_2$NR"— and —NR"$SO_2$— groups), arylene groups, alkylene groups and the like. R", which can be the same or different, represents hydrogen or an organic group such as a substituted or unsubstituted aryl or alkyl group. As shown by the structure above, a group comprising at least two phosphonic acid groups or salts thereof is bonded to X through the spacer group Sp. Preferably, Sp is —$CO_2$—, —$O_2C$—, —O—, —NR"—, —NR"CO—, or —CONR"—, —$SO_2$NR"—, —$SO_2CH_2CH_2$NR"—, —$SO_2CH_2CH_2$O—, or —$SO_2CH_2CH_2$S— wherein R" is H or a C1-C6 alkyl group.

Furthermore, the organic group may comprise a salt of a group having the formula —$CR(PO_3H_2)_2$ or partial esters thereof. In this formula, R is H or a C1-C6 alkyl group, such as a methyl or ethyl group, but is preferably H. For example, the organic group may comprise a salt of a group having the formula —CO-Q-CH$(PO_3H_2)_2$ or —$SO_2$-Q-CH$(PO_3H_2)_2$ or partial esters thereof, wherein Q is O, S, or NR'" and R'" is H, a C1-C18 alkyl group, a C1-C18 acyl group, an aralkyl group, an alkaryl group, or an aryl group. Preferably, Q is NH, and, thus, the organic group comprises at least one alkyl amide group wherein the alkyl group is a salt of a geminal bisphosphonic acid group or partial esters thereof.

As a specific example, the organic group may be a salt of a group having the formula —X—CO-Q-CH$(PO_3H_2)_2$ or —X—$SO_2$-Q-CH$(PO_3H_2)_2$ or partial esters thereof. In this example, X is attached to the pigment and is an arylene, heteroarylene, alkylene, alkarylene, or aralkylene group. When X is an alkylene group, examples include, but are not limited to, substituted or unsubstituted alkylene groups, which may be branched or unbranched and can be substituted with one or more groups, such as aromatic groups. Specific examples include $C_1$-$C_{12}$ groups, such as methylene, ethylene, propylene, or butylene groups. Preferably X is an arylene group, such as a phenylene, naphthalene, or biphenylene group. For example, the organic group may be a salt of a —C$_6$H$_4$—CONHCH(PO$_3$H$_2$)$_2$ group, a salt of a —C$_6$H$_4$—SO$_2$NHCH(PO$_3$H$_2$)$_2$ group, or partial esters thereof. Preferably, X is directly attached to the pigment, meaning there are no additional atoms or groups from the attached organic group between the pigment and X The amount of attached organic groups can be varied, depending on the desired use of the modified pigment and the type of the attached group. For example, the total amount of organic group may be from about 0.01 to about 10.0 micromoles of groups/m$^2$ surface area of pigment, as measured by nitrogen adsorption (BET method), including from about 0.5 to about 5.0 micromoles/m$^2$, from about 1 to about 3 micromoles/m$^2$, or from about 2 to about 2.5 micromoles/m$^2$. Additional ranges include, for example, 0.25 to 0.50 mmols treating agent per gram of pigment. Other attached organic groups, which differ from those described for the various embodiments of the present invention, may also be present, including, for example, ionic or ionizable groups, such as those described in U.S. Pat. Nos. 5,630,868 and 5,698,016, and polymeric groups.

The amount of modified pigment used in the inkjet ink composition of the present invention can be varied but is typically in an amount effective to provide the desired image quality (for example, optical density) without detrimentally affecting the performance of the thermal inkjet ink. For example, typically, the modified pigment will be present in an amount ranging from about 0.1% to about 20% based on the total weight of the thermal inkjet ink composition. The modified pigment may be present in an amount ranging from about 1% to about 15%, from about 2% to about 10%, from about 2% to about 6%, or from about 4% to about 6%, based on the total weight of the inkjet ink composition.

The composition may comprise a polymer such as a polyurethane. As used herein the term "polymer dispersion" refers to aqueous dispersions of polymer particles, which can be formed, for example, either by dispersing polymer particles in an aqueous medium using dispersants or by forming polymer particles by polymerization in an aqueous medium. Examples include polymeric latexes, such as those formed by free radical polymerization acrylate, methacrylate, and styrenic monomers, as well as polyurethane dispersions, formed by polymerization of polyurethane precursors.

For example, the compositions of the present invention may comprise a polyurethane dispersion, which is an aqueous dispersion of a polymer containing urethane groups and optionally urea groups, as those terms are understood by those of ordinary skill in the art. These polymers also incorporate hydrophilic functionality to the extent required to maintain a stable dispersion of the polymer in water. A polymer is considered to be hydrophilic if it is soluble in water at greater than 1% by weight at a pH of 7 at room temperature. Preferred polyurethane dispersions are those that are ionically self-stabilized, in which the polymer is predominantly stabilized in the dispersion through incorporated ionic functionality, and particularly anionic functionality such as neutralized acid groups ("anionically self-stabilized polyurethane dispersions"). Most preferred is a self-stabilized polyurethane dispersion comprising a polyurethane having the ionic functionality, particularly an anionic functionality incorporated through the use of chain extenders having acid groups, described in more detail below.

The aqueous polyurethane dispersions may be prepared by a multi-step process in which an isocyanate (N═C═O, NCO) pre-polymer is initially formed and subsequently chain extended in the aqueous phase, optionally in the presence of a polyfunctional group chain extender. As used herein, a polyurethane pre-polymer is a reactive oligomer that is of lower molecular weight than the final polymer product that results from chain extension in the aqueous phase. The isocyanate pre-polymer can be formed by a multi-step process. For example, in the first stage of pre-polymer formation, a diisocyanate is reacted with a compound containing one or more isocyanate-reactive groups and at least one acid or acid salt group to form an intermediate product. For instance, a high molecular weight diol and be reacted with an isocyanate and an ionic or non-ionic low molecular weight diol to form a pre-polymer. The molar ratio of diisocyanate to compounds containing isocyanate-reactive groups is such that the equivalents of isocyanate functionality is greater than the equivalents of isocyanate-reactive functionality, resulting in an intermediate product terminated by at least one NCO group. Thus, the ratio of isocyanate groups to isocyanate-reactive groups (typically NCO:OH) may be greater than 1:1, 1:1 to 2:1, 1:1 to 1.5:1, 1:1 to 1.1:1 and about 1.05:1. Ratios for mixtures of compounds containing one and two isocyanate-reactive groups can be readily determined depending on the ratio of the two. In general, the various ratios ensure that at least one of the isocyanate-reactive groups of the compounds containing acid groups are reacted with isocyanate groups, and preferably most of the isocyanate-reactive groups are reacted with isocyanate groups from the isocyanate.

Suitable examples of diisocyanates for reacting with the isocyanate-reactive compound containing ionic groups (or groups which can be rendered ionic, such as by neutralization) are those which contain either aromatic, cycloaliphatic or aliphatic-bound isocyanate groups. Specific examples of cycloaliphatic or aromatic diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; bis-(4-isocyanatocyclohexyl)-methane; 2,4'-diisocyanato-dicyclohexyl methane; bis-(4-isocyanato-3-methyl-cyclohexyl)-methane, α,α, α',α'-tetramethyl-1,3- and/or -1,4-xylylene diisocyanate; 1-isocyanato-1-methyl-4(3)-isocyanatomethyl cyclohexane; toluene diisocyanate (TDI) and 2,4- and/or 2,6-hexahydrotoluoylene diisocyanate. Suitable examples of aliphatic diisocyanates are those containing linear or branched aliphatic groups having 4 to 12 carbon atoms, preferably 4 to 8 carbon atoms, and more preferably 6 carbon atoms, which include 1,4-tetramethylene diisocyanate; 1,6-hexamethylene diisocyanate (HDMI); 2,2,4-trimethyl-1,6-hexamethylene diisocyanate; and 1,12-dodecamethylene diisocyanate.

In one set of embodiments, the diisocyanate may be selected from one or more of:

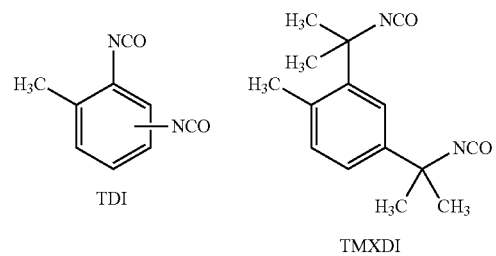

TDI

TMXDI

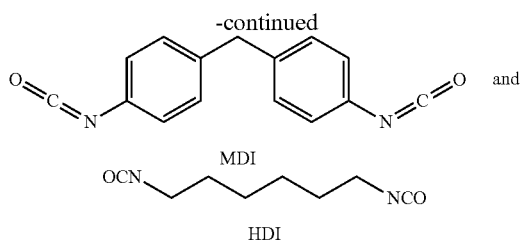

MDI

HDI

Isocyanate-reactive compounds containing acid groups, such as carboxylic acid groups, carboxylate groups, sulphonic acid groups, sulphonate groups, phosphoric acid groups and phosphonate groups, can be chemically incorporated into the polyurethane to provide hydrophilicity and to improve stability in an aqueous medium. Suitable compounds for incorporating carboxyl groups are described in U.S. Pat. Nos. 3,479,310, 4,108,814, and 4,408,008, which are incorporated in their entirety by reference herein. The acid salts are formed by neutralizing the corresponding acid groups either prior to, during or after formation of the isocyanate prepolymer, preferably after formation of the isocyanate prepolymer. Suitable neutralizing agents for converting carboxylic acid groups to carboxylate salt groups are also described in the preceding U.S. patents. As used herein, the term "neutralizing agents" is meant to embrace all types of agents which are useful for converting carboxylic acid groups to hydrophilic carboxylate salt groups.

Carboxylic group-containing isocyanate-reactive compounds are hydroxy-carboxylic acid compounds having the formula $(HO)_xZ(COOH)_y$, wherein Z represents a straight or branched, hydrocarbon radical containing 1 to 12 carbon atoms, x is 1 or 2, preferably 2, and y is 1 to 3, preferably 1 or 2 and more preferably 1. Specific examples of these hydroxy-carboxylic acids include citric acid, tartaric acid and hydroxypivalic acid. Especially preferred acids are those of the above-mentioned formula wherein x is 2 and y is 1. These dihydroxy alkanoic acids are described in U.S. Pat. No. 3,412,054, which is incorporated in its entirety by reference herein. Especially preferred dihydroxy alkanoic acids are α,α-dimethylol alkanoic acids having the formula $Z'—C(CH_2OH)_2COOH$, wherein Z' is hydrogen or an alkyl group containing 1 to 8 carbon atoms. A specific example is α,α-dimethylol propionic acid (DMPA), i.e., wherein Z' is methyl in the above formula.

The acid groups can be incorporated in the isocyanate-reactive compound in an amount sufficient to provide an ionic group content of at least about 3, at least about 10, at least about 15 and preferably at least about 18 milligrams of KOH/gram of polyurethane resin solids. The upper limit for the content of acid groups is about 100, preferably about 60, and more preferably about 40 milligrams per 1 g of polyurethane resins solids. This ionic group content is equivalent to an acid number for the polyurethane resin solids.

Suitable higher molecular weight polyols are those containing at least two hydroxy groups and having, for example, a molecular weight of about 400 to about 6000, about 800 to about 3000, or about 1000 to about 2500. In one set of embodiments the preferred polyols have molecular weights from about 1600 to about 2300. The molecular weights are number average molecular weights (Mn) and are determined by end group analysis (OH number, hydroxyl analysis). Examples of these high molecular weight compounds include polyester polyols, polyether polyols, polyhydroxy polycarbonates, polyhydroxy polyacetals, polyhydroxy polyacrylates, polyhydroxy polyester amides, polyhydroxy polyolefins, polyhydroxy polyalkylsiloxanes, and polyhydroxy polythioethers. A combination of the polyols can also be used in the polyurethane. Preferably, polyester polyols or polyether polyols are used.

Suitable examples of polyester polyols include the reaction products of polyhydric alcohols, such as dihydric alcohols to which trihydric alcohols may be added, and polybasic carboxylic acids, such as dibasic carboxylic acids. Also, the corresponding carboxylic acid anhydrides or polycarboxylic acid esters of lower alcohols or mixtures thereof may be used. The polycarboxylic acid component may be aliphatic, cycloaliphatic, aromatic and/or heterocyclic and they may be substituted, for example, by halogen atoms, and/or unsaturated. Specific examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate. Suitable examples of the polyhydric alcohol component include ethylene glycol, propylene glycol, butylene glycol, hexanediol, octanediol, neopentyl glycol, cyclohexanedimethanol (1,4-bis-hydroxymethyl-cyclohexane), 2-methyl-1,3-propanediol, 2,2,4-trimethyl-1,3-pentanediol, triethylene glycol, tetra-ethylene glycol, polyethylene glycol, dipropylene glycol, polypropylene glycol, dibutylene glycol, polybutylene glycol, glycerine, and trimethylol-propane. The polyesters may also contain a portion of carboxyl end groups. Polyesters of lactones, such as ε-caprolactone, or hydroxycarboxylic acids, such as w-hydroxycaproic acid, may also be used.

Suitable examples of polycarbonates containing hydroxyl groups include the products obtained from the reaction of diols (such as propanediol, butanediol, or hexanediol), diethylene glycol, triethylene glycol or tetraethylene glycol with phosgene, diarylcarbonates such as diphenylcarbonate or with cyclic carbonates such as ethylene or propylene carbonate. Also, polyester carbonates obtained from the above-mentioned polyesters or polylactones with phosgene, diaryl carbonates or cyclic carbonates, can be used.

Suitable examples of polyether polyols are those obtained by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units, and, most preferably, the polyethers are obtained without the addition of ethylene oxide. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)ethane.

In addition, polyethers which have been obtained by the reaction of starting compounds containing amine compounds can also be used. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, which is incorporated in its entirety by reference herein.

Suitable examples of poly(meth)acrylates containing hydroxyl groups include those prepared by addition polymerization such as cationic, anionic and radical, polymerization and the like. Preferred are α-ω diols. An example of these types of diols are those which are prepared by a "living" or "control" or chain transfer polymerization processes which enables the placement of one hydroxyl group at or near the termini of the polymer. U.S. Pat. Nos. 6,248,839 and 5,990,245, both incorporated in their entirety by reference herein, describe examples of protocols for making such terminal diols. In one set of embodiments, specific high molecular weight polyols may include, for example, polyethers and/or polyesters. These may include, for instance, polypropylene glycol (PPG) polyols:

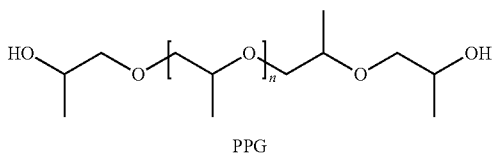

PPG and polytetrahydrofuran (PTHF) polyols:

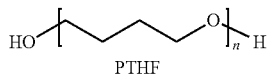

PTHF

Commercially available polyols include VORANOL® 220-056N from Dow Chemical; PCDL-T5625 and PCDL-T4672 available from Kasei as well as Oxymer® M56, available from Perstorp.

The high molecular weight polyols that are reacted to form the pre-polymer are generally present in the polyurethanes in an amount of at least about 5%, at least about 10%, or at least about 15% by weight, based on the weight of the polyurethane. The weight percent of these polyols is generally less than 90%, and often between about 50-90% or between about 75-90%, based on the weight of the polyurethane.

Other optional compounds may be used for preparing the isocyanate pre-polymer. These include low molecular weight, at least difunctional isocyanate-reactive compounds having an average molecular weight of up to about 400. Examples include dihydric and higher functionality alcohols, which have previously been described for the preparation of the polyester polyols and polyether polyols. Also, in addition to the above-mentioned difunctional components used in the isocyanate polyaddition reaction, mono-functional and even small portions of trifunctional and higher functional components can also be used. For example, trimethylolpropane or 4-isocyanantomethyl-1,8-octamethylene diisocyanate may be used in order to provide a slight branching of the isocyanate pre-polymer or polyurethane. However, the isocyanate pre-polymers should be substantially linear, and this may be achieved by maintaining the average functionality of the pre-polymer starting components at or below 2:1.

Other optional compounds also include isocyanate-reactive compounds containing lateral or terminal hydrophilic ethylene oxide units. These may have a content of the hydrophilic ethylene oxide units of up to about 10%, preferably up to about 8%, more preferably about 1 to about 6% and most preferably about 2 to about 6%, by weight, based on the weight of the polyurethane. In addition, up to about 75% of the allowable, chemically incorporated, hydrophilic ethylene oxide units may be replaced by known nonionic, external emulsifiers including, for example, alkaryl types (such as polyoxyethylene nonyl phenyl ether or polyoxyethylene octyl phenyl ether), alkyl ether types (such as polyoxyethylene lauryl ether or polyoxyethylene oleyl ether), alkyl ester types (such as polyoxyethylene laurate, polyoxyethylene oleate or polyoxyethylene stearate), and polyoxyethylene benzylated phenyl ether types. The isocyanate-reactive compounds for incorporating lateral or terminal hydrophilic ethylene oxide units may contain either one or two isocyanate-reactive groups, preferably hydroxy groups. Examples include those disclosed in U.S. Pat. Nos. 3,905,929, 3,920,598, and 4,190,566, which are incorporated in their entirety by reference herein. Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, such as propylene oxide.

Other optional compounds also include isocyanate-reactive compounds containing self-condensing moieties. The content of these compounds are dependent upon the desired level of self-condensation necessary to provide the desired resin properties. For example, 3-amino-1-triethoxysilyl-propane will react with isocyanates through the amino group and yet self-condense through the silyl group when inverted into water. Non-condensable silanes with isocyanate reactive groups can also be used either in place of or in conjunction with the isocyanate-reactive compounds containing self-condensing moieties. U.S. Pat. Nos. 5,760,123 and 6,046,295, both incorporated in their entirety by reference herein, describe methods for use of these optional silane containing compounds.

Any process conditions for preparing the isocyanate pre-polymers can be used, including those described in the patents previously incorporated by reference. The final isocyanate pre-polymer can have a free isocyanate content of about 1 to about 20%, or about 1 to about 10% by weight, based on the weight of pre-polymer solids.

Other monomers and/or oligomers that will not participate chemically in the polyurethane synthesis steps can be added. The addition can be anywhere in the synthetic cycle as long as there is no interference in the polyurethane synthesis. A specific example of a compatible oligomer/monomer is a styrene allyl alcohol, abbreviated SM.

In one set of embodiments a composition can be made by polymerizing one or more polyurethane pre-polymers in the presence of a pigment. For example, a pre-polymer made by combining an isocyanate with a isocyanate-reactive polyol can be dissolved in a non-aqueous solvent and then the polymerization of the pre-polymer can be initialized by adding it to an aqueous vehicle containing a self-dispersed pigment prior to. The pre-polymer, including terminal isocyanate groups, can subsequently be polymerized in the presence of the self-dispersed pigment to produce high molecular weight polyurethane particles, lower molecular weight polyurethane molecules and/or pigment particles associated with polyurethane molecules. The polyurethane particles may be dispersed in the vehicle while the polyurethane molecules are soluble in the vehicle. As used herein, a polyurethane molecule is "associated" with a pigment if it does not move independently of the pigment in the liquid vehicle. Polyurethane polymer may be associated with the pigment, for example, via covalent attachment, ionic attachment, ion-ion, ion-H-bonding, ion-dipole, and/or H-bonding. Independent polyurethane polymer particles may be present in the composition and need not be associated with the pigment. Likewise, soluble polyurethane molecules may also be present in the composition without being associated with the pigment.

The composition may include polyurethane in any one, two or three of the forms described above. Conceptual structures of each of these forms are provided in FIGS. 1A, 1B and 1C. FIG. 1A illustrates the roughly spherical structure of one type of a dispersible polyurethane particle. It is believed that the polyols can form soft segments (lighter shade in figures) on the particle that can contribute to the glass transition temperature (Tg) and the degree of crystallization of the polymer as well as to hydrophobic interactions. The isocyanates may contribute hard segments (darker shade in figures) that are believed to promote a variety of interactions including ion-ion, ion-H-bonding, ion-diple, and H-bonding. These species may be dispersible but typically are not soluble in aqueous vehicles.

The dispersible polyurethane particles can be characterized by a variety of techniques known in the art. For example, differential scanning calorimetry (DSC) can be used to characterize the thermal transitions of the polyurethanes. The initial $T_g$ is a characteristic feature of a polyurethane. The dispersible polyurethane particles used in the composition described herein may have $T_g$ of less than about 0° C., less than about −10° C., less than about −20° C., less than about −30° C. or less than about −40° C. Standard thermogravimetric techniques can be used to determine these glass transition temperatures. Furthermore, molecular weight is also a characteristic of the dispersible polyurethane particles and is routinely reported as weight average molecular weight, Mw. The molecular weight of the dispersible polyurethane particles used in the inkjet ink composition may range, for example, from 20K to 200,000K, 30K to 100,000K and 40K to 100k as Mw. The dispersible polyurethane particles are not limited to Gaussian distribution of molecular weight, but may have other distributions such as bimodal distributions. The particle size of the dispersible polyurethane particles can range, for example, from about 20 to 300 nm, 40 to 150 nm or 60 to 120 nm.

Figure 1B:
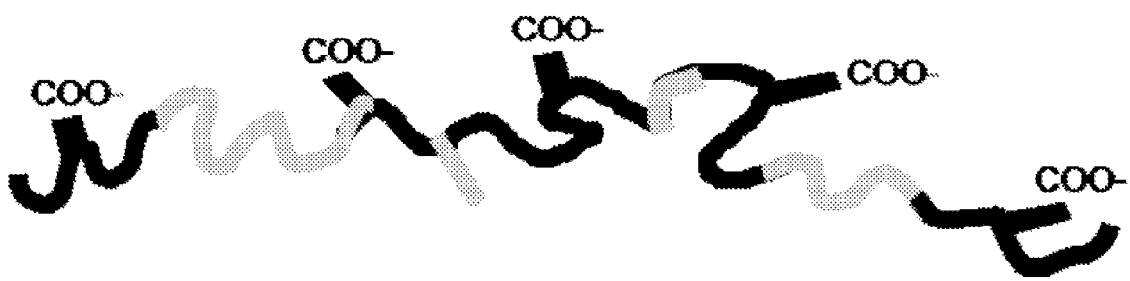
FIG. 1B provides a conceptual representation of a soluble polyurethane molecule.

The molecule shown in FIG. 1B roughly illustrates the structure of a soluble polyurethane polymer molecule and is provided to show the difference between these soluble molecules and the dispersible particles of FIG. 1A. Although these soluble molecules are different than the dispersible particles, they may be formed from the same pre-polymer under the same reaction conditions. They may also include both "hard" and "soft" segments. These soluble polyurethanes may typically be of lower molecular weight than the dispersible particles and may not exhibit the three dimensional structure that the dispersible particles do. The soluble polyurethane molecules may have more hydrophilic character or hydrophilic moieties than do the dispersible polyurethane particles. The soluble polyurethane molecules may be soluble in aqueous vehicles without the aid of dispersants and they may be soluble in water at concentrations up to 1 mg/L, 10 mg/L, 100 mg/L or more. Molecular weights may vary and the average molecule weight of the soluble molecules may range from, for example, 1,000 to 100,000; 5,000 to 50,000 or 12,000 to 40,000 as Mw. These polyurethane molecules may be produced using a pre-polymer, or combination of pre-polymers, of any of the pre-polymer systems described herein.

Figure 1C:
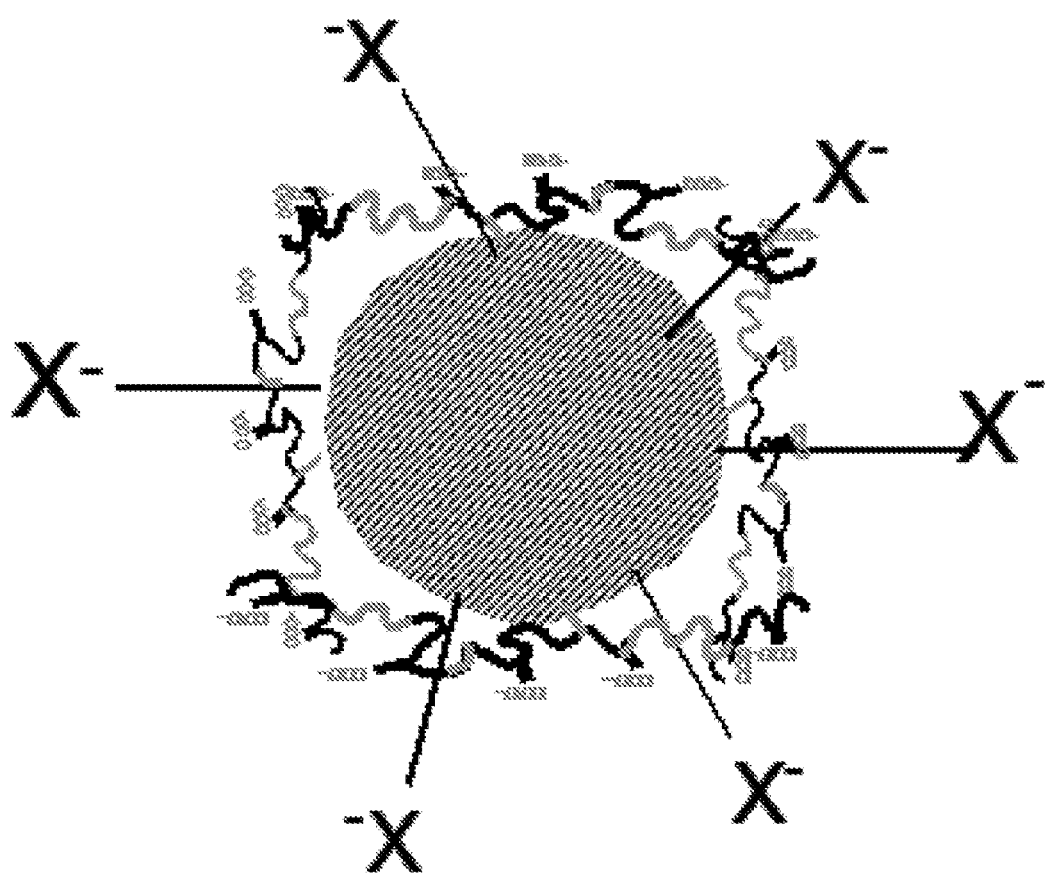
FIG. 1C provides a conceptual representation of polyurethane molecules associated with a pigment particle.

FIG. 1C illustrates schematically a third species of polyurethane that may be used in the composition. As shown, one or more polyurethane molecules may be adsorbed onto a pigment particle and may be considered to be associated with the pigment to form a polyurethane adsorbed pigment particle. In one set of embodiments the polyurethane may be polymerized in situ with a self-dispersed pigment and may form a unitary structure that includes both the pigment and the polyurethane. The polyurethane may be bound to the pigment particle, such as by covalent or ionic bonding or may be associated via hydrogen bonding, ion-ion bonding, ion-H bonding or ion-dipole bonding. In specific embodiments, polyurethane adsorbed pigment particle size, when measured by light scattering techniques (Nanotrac, Microtrac, Inc.) may fall in the range of 50-300 nm, 100-200 nm or 120-180 nm. The particle size of the polyurethane adsorbed pigment particles may be consistent or may vary from particle to particle. Particle size may vary with the amount of polymer associated with a specific particle. Thus, even starting with a consistent starting pigment particle size, the size of the product polyurethane adsorbed pigment particles may vary by more than 10%, more than 20% or more than 30%. The molecular weight of the polyurethane molecules associated with the pigment may have an average molecular weight of from 3,000 to 100,000 or 6,000 to 60,000 as Mw. These molecular weights may be the same or different as the molecular weights of the soluble polyurethane molecules or the dispersible polyurethane particles.

The amount of polymer associated with a pigment particle, wt/wt, on any single polyurethane adsorbed pigment particle or on the polyurethane adsorbed pigment particles in aggregate, may be, for example, greater than or equal to 1%, 5%, 10%, 20% or 50%. This percentage may be determined, for example, by centrifugation of the composition followed by thermal gravimetric analysis (TGA). These polyurethane adsorbed pigment particles may be produced using the same reaction sequence as the soluble polyurethane molecules and/or the dispersible polyurethane particles. The same or a different pre-polymer system may be used to make the polyurethane adsorbed pigment particles as is used to make either the dispersible polyurethane particles or the soluble polyurethane molecules.

Any one or more of the polyurethane species described herein may be present in the composition. For example, the composition may include dispersible polymer particles, soluble polymer molecules and polyurethane adsorbed pigment particles. Alternatively, the composition may include dispersible polymer particles and soluble polymer molecules; dispersible polymer particles and polyurethane adsorbed pigment particles; or soluble polymer molecules and polyurethane adsorbed pigment particles. Given a total mass of polyurethane polymer present in a composition, such as an inkjet dispersion, in different embodiments each of the three species of polyurethane polymer (soluble molecules, dispersible particles and polyurethane adsorbed pigment) may account for greater than 1%, greater than 2%, greater than 10%, greater than 20% or greater than 50%, by weight, of the total polyurethane polymer present. Similarly, each of these components may individually account for less than 90%, less than 80%, less than 50%, less than 20%, less than 10%, less than 5% or less than 1%, by weight, of the total polyurethane polymer present in the composition.

The pigment, which may be a self-dispersed carbon black, for instance, can be present in the composition in the form of a polyurethane adsorbed pigment as well as unassociated pigment. As a percentage of the total pigment present, the amount of pigment present as polyurethane adsorbed pigment may be greater than 1%, greater than 2%, greater than 5%, greater than 10%, greater than 20%, greater than 50% or greater than 90% by weight. In specific embodiments, the ratio of polymer to pigment, wt/wt, in the composition may be, for example, less than or equal to 2:1, less than or equal to 1:1, less than or equal to 0.66:1, less than or equal to 0.5:1, less than or equal to 0.4:1, less than or equal to 0.3:1 or less than or equal to 0.2:1. The ratio of polymer to pigment, wt/wt, may also be greater than or equal to 0.2:1, greater than or equal to 0.3:1, greater than or equal to 0.4:1, greater than or equal to 0.5:1, greater than or equal to 0.66:1, greater than or equal to 1:1, or greater than or equal to 2:1.

A pre-polymer may include a collection of polymer chains of differing molecule weights. When a reactive polyurethane pre-polymer is combined with a self-dispersed pigment dispersion the resulting polymerization may provide a collection of polyurethane entities that include soluble polymer particles, dispersed polymer particles and polyurethane associated with the self-dispersed pigment particles. By forming these different polyurethane entities in situ an aqueous inkjet composition can be formed without the need to directly add a polymeric polyurethane emulsion or solution to the pigment dispersion. This in situ polymer formation can allow the polyurethane pre-polymer to polymerize and partition into soluble, particulate and pigment associated entities. The formation of these different entities may not be achievable by simply adding a polyurethane dispersion to a pigment dispersion. The self-dispersed pigment particles that are associated with a polyurethane entity can maintain or improve their dispersibility in aqueous solutions. In an inkjet composition the result can be a dispersion that has excellent jetting properties yet provides improved printing characteristics such as durability and optical density. Furthermore, the dispersions may be stable at high (greater than 10 or greater than 15 percent by weight) solids loadings making them particularly useful as inkjet compositions that can be diluted with a variety of aqueous inkjet vehicles to produce commercially useful inkjet inks.

The composition may include a liquid vehicle that can be aqueous. The composition may be void of non-aqueous solvents and/or may be void of dispersants that are not associated with, or bound to, the pigment. The vehicle may include aqueous compatible additives such as polyalcohols, surfactants, dispersants, pH buffers, and preservatives. The aqueous vehicle may include for instance, water-soluble co-solvents or humectants such as, for example, alcohols, ketones, keto-alcohols, ethers, sulfones, sulfoxides, lactones and lactams; glycerol and derivatives thereof; glycols such as ethylene glycol, and tetraethylene glycol, propylene glycol, di- and tri-propylene glycol, trimethylene glycol, butylene glycol, hexylene glycol and thiodiglycol; addition polymers of oxyethylene or oxypropylene such as polyethylene glycol, polypropylene glycol and the like; mono- and di-alkyl ($C_1$-$C_4$) ethers of mono-, di- and tri-ethylene glycol and mono-, di- and tri-propylene glycols; linear or branched $C_4$-$C_8$ diols and triols.

The total amount of pigment and polymer in the inkjet composition may be, by weight percent of total dispersion, for example, between 2% and 15%, between 3% and 12%, between 6% and 10%, between 4% and 8% or between 4% and 7%. Good thermal inkjet printing results have been shown with ink compositions having solids content of from 3.5% to 6% by weight.

In one set of embodiments, inkjet compositions, and in particular thermal inkjet compositions, may be produced, in general, as follows. A polyurethane pre-polymer is obtained by using methods known to those of skill in the art and/or by the methods described herein. A solution of the pre-polymer in non-aqueous (but miscible) solvent is then added to an aqueous solution of a self-dispersed pigment. The amounts of pre-polymer and self-dispersed pigment can be determined using, in part, the desired ratio of pigment to polymer. The mixture may then be agitated. The pH is adjusted and the mixture is allowed to stir overnight. The non-aqueous solvent is then removed from the mixture by evaporation (rotovap) and the resulting aqueous dispersion is sonicated. The resulting composition can then be diluted to produce an ink or can be stored for later use. Testing shows that the resulting dispersion exhibits improved printing capabilities and aging characteristics when compared to dispersions made by mixing a pre-prepared polyurethane polymer dispersion with a pigment dispersion.

In some embodiments, acid groups of the polyurethane can be neutralized so that, when combined with the optional hydrophilic ethylene oxide units and optional external emulsifiers, the resulting polyurethane will remain stably dispersed in the aqueous medium. More than 50%, more than 75% or more than 90% of the acid groups can be neutralized to the corresponding carboxylate salt groups. Suitable neutralizing agents for converting the acid groups to salt groups either before, during or after their incorporation into the isocyanate pre-polymers, include tertiary amines, alkali metal cations and ammonia. Specific examples of these neutralizing agents are those described in U.S. Pat. Nos. 4,501,852 and 4,701,480, both of which are incorporated in their entirety by reference herein. Preferred neutralizing agents are the trialkyl-substituted tertiary amines, such as triethyl amine (TEA), tripropyl amine, dimethylcyclohexyl amine, and dimethylethyl amine.

For many embodiments of the present invention, the thermal inkjet ink composition can be formed with a minimum of additional components (additives and/or cosolvents) and processing steps. However, suitable additives may be incorporated in order to impart a number of desired properties while maintaining the stability of the compositions. For example, additional surface active agents, humectants, drying accelerators, penetrants, biocides, binders, and pH control agents, as well as other additives known in the art, may be added. The amount of a particular additive will vary depending on a variety of factors but generally ranges between 0% and 40%.

Surface active agents may be added to further enhance the colloidal stability of the composition or to change the interaction of the ink with either the printing substrate, such as printing paper, or with the ink printhead. Various anionic, cationic and nonionic surface active agents can be used in conjunction with the ink composition of the present invention, and these may be in solid form or as a water solution.

Representative examples of anionic surface active agents include, but are not limited to, higher fatty acid salts, higher alkyldicarboxylates, sulfuric acid ester salts of higher alcohols, higher alkyl-sulfonates, alkylbenzenesulfonates, alkyl-naphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates, alkyl phosphates, and alkyl phosphonates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic surface active agents that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol® 420, Surfynol® 440, and Surfynol® 465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surface active agents can be used alone or in combination with the aforementioned anionic and cationic dispersants.

The surface active agent may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly (meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, such as the SMA™ resins from Sartomer that can be hydrolyzed in water, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants and additives in inkjet inks are included in the Tego products from Degussa, the Ethacryl products from Lyondell, the Joncryl polymers from BASF, the EFKA dispersants from Ciba, and the Disperbyk and Byk dispersants from BYK Chemie.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers (such as the Joncryl line from BASF, Carbomers from Noveon), styrene-acrylic acid-alkyl acrylate terpolymers, styrene-methacrylic acid copolymers (such as the Joncryl line from BASF), styrene-maleic acid copolymers (such as the SMA™ resins from Sartomer), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in inkjet inks are included in the Ethacryl products from Lyondell, the Joncryl polymers from BASF, the NeoCryl materials from NSM Neoresins, and the AC and AS polymers Alberdingk-Boley.

Various additives for controlling or regulating the pH of the inkjet composition of the present invention may also be used. Examples of suitable pH regulators include various amines such as diethanolamine and triethanolamine as well as various hydroxide reagents. An hydroxide reagent is any reagent that comprises an OH⁻ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH⁻ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified to remove impurities and other undesirable free species which can co-exist as a result of the manufacturing process using any method known in the art including, for example, ultrafiltration/diafiltration using a membrane, reverse osmosis, and ion exchange. Also, the inkjet ink compositions can be subjected to a classification step, such as filtration, centrifugation, or a combination of the two methods to substantially remove particles having a size above, for example, about 1.0 micron. In this way, unwanted impurities or undesirable large particles can be removed to produce an inkjet ink composition with good overall properties.

EXAMPLES

A series of pigment dispersions were made to compare the properties of different types of pigment/polymer combinations. Dispersions wherein the pre-polymer was polymerized in situ with a pigment were compared to dispersions in which a polymer dispersion was added to a pigment dispersion. Results indicate improved performance and printing characteristics for polymer/pigment dispersions that are polymerized in situ. These dispersions include fractions of polyurethane polymer that are associated with the pigment and fractions of the polyurethane polymer that are unassociated with the pigment.

Example 1

1(a)—Production of a Polyurethane Pre-polymer

A 1 L cylindrical reactor was charged with 93.55 g of VORANOL® Polyol 220-056N (a polyether polyol having an average molecular weight of 2,000, available from Dow Chemical), 9.55 g of dimethylpropionic acid (DMPA) and 19.11 g of NMP. The mixture was stirred with two PTFE stirrers under a 1 mm vacuum. The reactor was then purged with nitrogen and heated to 100° C. to produce a clear, slightly yellow solution. The solution was heated under vacuum for 20 minutes using a dry ice-IPA trap. The vessel was then backflushed with dry nitrogen and cooled to 60° C. 21.78 g of TDI (MONDUR® TD-80 available from Bayer) was added slowly using a 60 mL plastic syringe at 59° C. The temperature initially dropped to 57° C. and then exothermed quickly, requiring cooling air to keep the temperature below 70° C. The remaining TDI was then added to the mixture which increased in temperature to about 73° C. 8 drops of tin catalyst (dibutyl tin dilaurate) were added and the temperature was set to 80° C. Mixing continued for about 3.5 hours resulting in a more viscous, slightly yellow mixture. The temperature was reduced to 55° C. 520 mL of dry acetone was added and mixed over about an hour to produce a solution having 40% pre-polymer solids content.

Production of Bis-Phosphonate Modified Pigment

A bis-phosphonate modified carbon black pigment was produced as described below and as described in U.S. Patent Application Publication No. 2007/0100024 which is incorporated by reference herein.

[2-(4-(Aminophenyl)-1-hydroxyethane-1,1-diylbisphosphonic acid monosodium salt was prepared using a procedure similar to that shown in Kieczykowski et al., J. Org. Chem., 1995, 60, 8310-8312 as well as in U.S. Pat. No. 4,922,007, which are incorporated in their entirety by reference herein. Thus, a 500 mL three neck flask was fitted with a condenser with a gas outlet on the top of the condenser, a thermometer and dry nitrogen inlet, and a 100 mL pressure equilibrating addition funnel. To this flask was first added 32 g of phosphorous acid (380 mmol) and 160 mL of methanesulfonic acid (solvent). To the stirred mixture was added portion-wise 57.4 g of aminophenyl acetic acid (380 mmol). The stirred mixture was heated to 65° C. for 1-2 hours to allow the solids to completely dissolve. The whole system was flushed with dry nitrogen, and the temperature was reduced to 40° C. after all of the solids had dissolved. To this heated solution was slowly added 70 mL of $PCl_3$ (800 mmol) through the addition funnel. HCl gas was generated from the reaction, which flowed through the gas outlet, into a dry tube, and then into a concentrated NaOH solution in a beaker through a funnel. After the addition was complete, the reaction mixture was stirred and heated at 40° C. for two hours. After this time, the temperature was raised to 65-70° C., and the mixture was stirred overnight. The resulting clear, brown colored solution was cooled to room temperature and quenched by addition into 600 g of an ice/water mixture. The aqueous mixture was placed into a 1 L beaker and was heated to 90-95° C. for 4 hours (the top of the beaker could be covered with a glass plate). The mixture was then allowed to cool to room temperature, and the pH of the mixture was adjusted to 4-5 with 50% NaOH solution, added slowly as the temperature would rise as a result of the quenching. The mixture was cooled to 5° C. with an ice bath for 2 hours and then the resulting solids were collected by suction filtration, washed with 1 L cold DI water and dried at 60° C. overnight, yielding a white or off white solid product (yield was 48 g, 39%). $^1$HNMR data for this compound ($D_2O$/NaOH) was as follows: 7.3 (2H, d), 6.76 (2H, d), 3.2 (2H, t). $^{13}$CNMR data for this compound ($D_2O$/NaOH) was as follows: 141, 130, 128, 112, 73.

20 g of Black Pearls 700 (Cabot Corp) pigment, 20 mmol of the phosphonic acid treating agent as prepared above, 20 mmol of nitric acid, and 200 mL of DI water were mixed with a Silverson mixer (6000 rpm) at room temperature. After 30 min, sodium nitrite (20 mmol) in a small amount of water was added slowly into the mixture. The temperature reached 60° C. through mixing, and this was allowed to proceed for 1 hour. A modified pigment of the present invention was produced. The pH was adjusted to 10 with a NaOH solution. After 30 min, the resulting dispersion of modified pigment, comprising a pigment having attached at least two phosphonic acid groups or salts thereof, was diafiltered with a Spectrum membrane using 20 volumes of DI water and concentrated to approximately 12% solids. After 30 min of sonication with a sonic probe, the mean volume particle size (mV) of the modified pigment in the dispersion was determined.

Production of Pigment/Polyurethane Dispersion

Experimental Sample E1

A 10% (by weight) aqueous dispersion of the bis-phosphonate modified carbon black described above was produced by suspending the modified carbon black in water. A 107 g sample of the pre-polymer sol produced in 1(a), above, having an acid number of 32.0 was treated with triethyl amine (TEA) at a concentration equal to 0.66 equivalents per equivalent of COOH and allowed to react for 30 minutes at 40° C. The sol was diluted with enough acetone to provide a 20% solution of polyurethane pre-polymer in acetone. 600 g of the 10% aqueous carbon black dispersion were added to 150 g of the 20% pre-polymer solution in acetone using a single smooth addition. The mixture was agitated with a metallic stir-bar. The pH was adjusted to 8.5 using KOH, and the mixture was left to stir overnight. The following day acetone was removed using a rotary evaporator and the resulting aqueous dispersion was sonicated using a MMIR-5HUPS6 (Misonix) sonic horn. The finished dispersion, identified as sample E1, having a carbon black to polymer weight ratio of 2:1, was then heat age tested and made into a thermal inkjet ink for print testing.

Additional test dispersions were formulated as in E1 above with the following modifications:

In sample E2 the TEA neutralization step was omitted.

In sample E3 the ratio of carbon black to polymer by weight was 2.5:1.

In sample E4 the ratio of carbon black to polymer by weight was 2.5:1 and the TEA neutralization step was omitted.

Sample A

The same self-dispersed carbon black used in Example E1 was adjusted to pH greater than 10 with KOH and was dried to solids in an oven at 120° C. The dried pigment was ground with a mortar and pestle, and 40 g of the dried pigment was added to 150 g of a 20% solution of the polyurethane pre-polymer (of example (1)(a)) in acetone and an additional 150 mL of acetone to arrive at a mixture having a 2:1 ratio of carbon black to polyurethane, by weight. The pigment/urethane mixture was mixed for one hour at 4000-4500 rpm and then was mixed with a magnetic stirrer overnight. 1.8 g of 45% KOH was diluted in 160 g of water and this solution was added to the mixture and allowed to mix for 1 hour. The pH was adjusted to 8.5 with 20% KOH and the acetone was removed using a rotovap. The aqueous dispersion was then sonicated to provide a finished dispersion, A1, ready for physical/chemical analysis and print testing. Additional dispersions were prepared using the same procedure but at carbon black to polyurethane ratios of 1.5:1 (A2) and 1:1 (A3) by weight.

A pre-prepared polyurethane polymer dispersion was made by polymerizing the prepolymer sol of Example 1(a), above, in water. The resulting polyurethane dispersion was mixed with the same self-dispersed carbon black used in example E1 to produce control samples having carbon black to polyurethane ratios of 2:1 (sample C1) and 1:1 (sample C2) by weight. These controls differ from the experimental samples in that the polyurethane is fully polymerized before it is mixed with the pigment. In the experimental samples, the pre-polymer is polymerized in the presence of the modified pigment.

A second control was produced using the self-dispersed carbon black used to make example E1 but without any polymer added (sample C3).

Table 1 reports the physical properties of dispersions obtained by adding dried self-dispersed pigment to a non-aqueous pre-polymer solution as described in Examples A, above. An "s" after a sample number indicates that the dispersion was sonicated as described above. Properties reported include the ratio, by weight, of carbon black pigment to polyurethane polymer; the total percent solids in the dispersion; the viscosity (when measurable) of the dispersion; the pH of the dispersion; the pigment particle size; and the distribution of the pigment particle size at 50%; and 100%. Samples C1 and C2 were control samples made as described above. At comparable solids levels, these controls exhibited significantly higher viscosity and particle size when compared to the experimental samples.

TABLE 1

| Sample | Pigment:Polymer | % Solids | visc (cP) | pH | mv (um) | 50% | 100% |
|---|---|---|---|---|---|---|---|
| A1 | 2:1 | 13.8 | 3.02 | 7.67 | 0.1399 | 0.134 | 0.344 |
| A2 | 1.5:1 | 13.98 | 2.94 | 7.75 | 0.1368 | 0.1315 | 0.344 |
| A3(1) | 1:1 | 17.6 | 6.34 | 7.72 | 0.148 | 0.1464 | 0.289 |
| A3(2) | 1:1 | 14.0 | 3.62 | 7.72 | 0.148 | 0.1464 | 0.289 |
| C1 Control | 2:1 | 13.8 | 7.68 | 7.36 | 0.166 | 0.1551 | 0.486 |
| C2 Control | 1:1 | 17.6 | 9.96 | 7.12 | 0.1526 | 0.1496 | 0.344 |
| C3 Control | n/a | 15.1 | 2.66 | 8.23 | 0.1379 | 0.1345 | 0.289 |

Table 3 reports results obtained from inks made by diluting a selection of the dispersion samples from Table 1. The inks were produced by diluting to the desired solids content using the vehicle provided in Table 2. Other inks described herein were formulated using the same vehicle, unless otherwise noted.

TABLE 2

| Weight % | Material |
|---|---|
| 2 | Glycerol |
| 2 | Ethylene Glycol |
| 3 | Hexanediol |
| 5 | Triethyleneglycol monobutyl ether |
| 3 | 2-Pyrrolidone |
| 0.5 | TEOA |
| 0.5 | BYK 348 |
| Balance | Water |

The thermal inkjet ink compositions were printed using a Canon ip4000 thermal inkjet ink printer. Each thermal inkjet ink composition was loaded into a Canon compatible cartridge (available from Inkjet Warehouse) and printed with the following printer settings: print quality—high; plain paper; grey scale; and no photo options selected. Images were printed on Hewlett-Packard multi-purpose printing paper (HPMP), and print properties of the resulting printed images were measured over various times after printing (particularly at 5 minutes and 24 hours). More specifically, the optical density (OD) of the printed images was measured using either a SpectroEye Gretag or X-rite 938 spectrophotometer. For both instruments, the following settings were used: Illumination at D65; 2 degree Standard Observer; DIN density standard; white base set to Abs; and no filter. Smearfastness was determined using a yellow Sharpie ACCENT Yellow Highlighter #45301 as follows: A double pass (two swipes, one on top of the other) of the highlighter on a non-printed portion of the paper was performed to establish a reference value. Then, another double pass was made across three 2-mm wide stripes printed 2 mm apart. The highlighter pen was cleaned between swipes on a piece of clean paper. Using the SpectroEye, the optical density (OD) values adjacent to the printed area for each swipe of the highlighter was measured, along with the reference OD value. The difference between the reference OD value and the measured OD value adjacent to the printed area (40D) is the smearfastness (HLS) value.

The results shown in Table 3 report the ratio, by weight, of the carbon black pigment to polyurethane polymer; the total percent solids; the percent by weight of carbon black pigment; the percent by weight of polymer; the optical density (OD); HLS after 5 minutes; HLS after one hour; and HLS after 24 hours. Analogous inks (equivalent to sample C3) using the same pigment without the addition of a polymer have provided HLS results of 0.43 after 5 minutes and 0.22 after 24 hours. All of the inks shown in Table 3 provide superior HLS test results when compared to the same ink without polyurethane.

TABLE 3

| Sample | Pigment:Polymer | % Solids | % CB | % Polymer | OD | 5 min HLS | 1 HR HLS | 24 HR HLS |
|---|---|---|---|---|---|---|---|---|
| A1 | 2:1 | 6 | 4 | 2 | 1.44 | 0.07 | 0.03 | 0.02 |
| A2 | 1.5:1 | 6 | 3.6 | 2.4 | 1.39 | 0.05 | 0.03 | 0.02 |
| A2 | 1.5:1 | 7 | 4.2 | 2.8 | 1.41 | 0.06 | 0.04 | 0.015 |
| A2 | 1.5:1 | 8 | 4.8 | 3.2 | 1.42 | 0.065 | 0.02 | 0.01 |
| A3 | 1:1 | 6 | 3 | 3 | 1.3 | 0.035 | 0.025 | 0.005 |
| A3 | 1:1 | 8 | 4 | 4 | 1.35 | 0.025 | 0.025 | 0 |
| C1 | 2:1 | 6 | 4 | 2 | 1.53 | 0.08 | 0.05 | 0 |

Inkjet dispersions and inks may be stored for various lengths of time and thus it may be important that the properties of the dispersion remain consistent over an extended period of time. To be considered stable, it is typical that the physical properties of an inkjet ink should remain within 10% of the original property values after the aging process. The results in Table 4 provide data for heat aging of two of the inks after 1 week at 60° C. The results in Table 5 provide data for the same two inks after 4 weeks of aging at 60° C. The large increase in viscosity and change in particle size indicates that the inks may not be suitable for use as commercial inkjet dispersions.

TABLE 4

Heat Aged 1 Week

| Sample | Pigment:Polymer | visc (cP) | % Change | pH | % Change | mv (um) | % Change | 50% | 100% |
|---|---|---|---|---|---|---|---|---|---|
| A1 | 2:1 | 10.9 | 261% | 7.28 | −5% | 0.2055 | 47% | 0.1914 | 0.687 |
| C1 | 2:1 | 4.62 | −40% | 7.11 | −3% | 0.1556 | −6% | 0.1464 | 0.409 |

TABLE 5

Heat Aged 4 Weeks

| Sample | Pigment:Polymer | visc (cP) | % Change | pH | % Change | mv (um) | % Change | 50% | 100% |
|---|---|---|---|---|---|---|---|---|---|
| A1 | 2:1 | 27.3 | 804% | 7.14 | −7% | 0.2814 | 101% | 0.2558 | 0.818 |
| C1 | 2:1 | 2.98 | −61% | 6.91 | −6% | 0.1522 | −8% | 0.1408 | 0.344 |

Additional inks were formulated using the dispersions of Example 1. These are the dispersions in which the pre-polymer was polymerized after addition to an aqueous pigment dispersion. The ink vehicle of Table 2 was used to dilute the dispersions to the solids levels provided in Table 6. The inks were printed onto plain white paper using a Canon ip4000 thermal inkjet printer. Sample names appended with an "S" indicate that the ink was sonicated. Data are provided for: the dispersion sample used to make the ink; the ratio, by weight, of the carbon black pigment to polyurethane polymer; an indication of whether sample was neutralized with TEA; the percent solids; the percent pigment; the percent polymer; the optical density; and the 5 minute and 24 hour HLS test results. Results show that the experimental samples are equivalent to, or slightly better than, control sample C1 when evaluating the inks for optical density and HLS.

TABLE 6

| Sample | Pigment:Polymer | 0.66eq TEA | % Solids | % CB | % Polymer | OD | 5 min | 24 HR |
|---|---|---|---|---|---|---|---|---|
| E2 | 2:1 | No | 6 | 4 | 2 | 1.51 | 0.02 | 0.01 |
| E2-S | | | 6 | 4 | 2 | 1.49 | 0.02 | 0.01 |
| E1 | 2:1 | Yes | 6 | 4 | 2 | 1.52 | 0.03 | 0.01 |
| E1-S | | | 6 | 4 | 2 | 1.51 | 0.05 | 0.01 |
| E4 | 2.5:1 | No | 5.5 | 3.9 | 1.6 | 1.54 | 0.045 | 0.03 |
| E4-S | | | 5.5 | 3.9 | 1.6 | 1.54 | 0.04 | 0.04 |
| E3 | 2.5:1 | Yes | 5.5 | 3.9 | 1.6 | 1.54 | 0.055 | 0.05 |
| E3-S | | | 5.5 | 3.9 | 1.6 | 1.54 | 0.05 | 0.025 |
| C1 (Control) | 2:1 | n/a | 6 | 4 | 2 | 1.53 | 0.08 | 0 |

To evaluate the stability of the dispersions used to make the inkjet inks of Table 6, experimental sample E1 was compared to control C1. Table 7 provides initial properties after the dispersions were made. Table 8 provides the properties, and percent change in those properties, after aging the dispersions for four days at 80° C. Results show a similar decrease in pH for each of the samples but the change in viscosity and particle size for the experimental sample was much less than it was for the control. This indicates that the experimental samples may be useful as inkjet dispersions where the control would not.

TABLE 7

Prior to Heat Aging

| Sample ID | Pigment:Polymer | % Solids | pH | visc (cP) | mv (um) | 50% | 100% |
|---|---|---|---|---|---|---|---|
| E1-S | 2:1 | 12.31 | 8.45 | 2.46 | 0.1392 | 0.1308 | 0.344 |
| C1 (Control) | 2:1 | 12.30 | 7.42 | 4.42 | 0.1506 | 0.1434 | 0.344 |

TABLE 8

After Heat Aging

| Sample ID | Pigment:Polymer | % Solids | pH | pH % Change | visc (cP) | Visc % Change | mv (um) | Particle Size % Change |
|---|---|---|---|---|---|---|---|---|
| E1-S | 2:1 | 12.31 | 7.45 | −11.8% | 2.34 | −4.9% | 0.1398 | 0.4% |
| C1 (Control) | 2:1 | 12.30 | 6.6 | −11.1% | 1.9 | −57.0% | 0.1316 | −12.6% |

While the addition of polyurethane to an inkjet ink may be helpful in improving smearfastness (durability), these dispersions may often exhibit a decrease in performance when evaluated for jetting characteristics. Typically it is desirable to have droplets of consistently large size, similar to what is achieved by OEM inks lacking a polyurethane component. To evaluate the jetting characteristics of the experimental compositions an Imtec Imaging System (IIS) was used to determine droplet size. The IIS determines droplet size by firing $10^7$ droplets and using the weight loss of the cartridge to calculate the average drop size (dropweight). In this evaluation, control samples were produced using the procedure used in sample C1 to produce one inkjet ink having 4% pigment and 1% polymer by weight and one inkjet ink having 4% pigment and 2% polymer by weight. The control sample at 1% polymer fired at about 32 ng per drop. The control sample at 2% polymer however exhibited a dropweight of about 24.7 ng. Experimental dispersion E1 was used to make an inkjet ink at 4% pigment and 2% polymer that exhibited a dropweight of about 32 ng. Similarly, dispersion E3 was used to make an inkjet ink at 4% pigment and 1.6% polymer, and this ink provided an average droplet size of 33.5 ng. An inkjet ink made from dispersion A1 (the dried pigment added to the pre-polymer solution) at 4% pigment 2% polymer provided an initial dropweight of about 38 ng but dropweight tailed off significantly as printing progressed. It is believed that this is due to the previously demonstrated instability of this dispersion. These results demonstrate the ability to produce droplets of optimal size with a thermal inkjet ink that includes at least 1% or at least 2% polyurethane by weight.

Additional dispersions were prepared using the process of Example 1 with various pigments. Black Pearls 880 (Cabot Corporation) was treated with $-C_6H_4-CONHCH(PO_3H_2)_2$ to produce a bisphosphonate modified pigment having a treatment level in the range of from 0.25 to 0.5 mmols/g. An aqueous dispersion of this bis-phosphonate modified pigment was reacted with a polyurethane pre-polymer as described in Example 1. Sample B1 was made using this dispersion at a polymer to pigment ratio of 0.6. Sample B2 was made using the same dispersion but at a polymer to pigment ratio of 0.5. Sample B3 was made using the same dispersion but at a polymer to pigment ratio of 0.4. Sample E5 was made in the same manner using the above-described bis-phosphonate modified Black Pearls 700 at a polymer to pigment ratio of 0.5. Control sample C4 was made by adding a prepared polyurethane polymer dispersion to bis-phosphonate modified Black Pearls 700 as described in Example C1, above Ink dispersions were produced from each of these compositions using the vehicle specified in Table 2.

To confirm the usefulness of the methods described herein with a variety of pigment types, additional inkjet compositions were produced using the same method used to produce Example E1. Print test results are provided in Table 11. Each of the compositions was formulated at a pigment to polymer ratio of 2.5:1, by weight. The polyurethane pre-polymer of Example 1(a) was reacted with bis-phosphonate modified Black Pearls 700 (as described above) in aqueous dispersion to produce sample E6 having a solids content of 14.41%, by weight. A color pigment example, PB1, was made by reacting the polyurethane pre-polymer of Example 1(a) with a bis-phosphonate modified cyan pigment that was produced as follows:

First, an aqueous dispersion of a pigment having attached phenyl-2-(sulfatoethylsulfone) groups was prepared according to the following general procedure. A ProcessAll 4HV Mixer (4 liter) was charged with 500 g of dry Pigment Blue 15:4 (Sun Chemical), 1 L of DI water, and 0.5 mol/Kg of 4-aminophenyl-2-sulfatoethylsulfone (APSES). The resultant mixture was then heated to 60° C. while intensely mixing at 300 RPM for 10 minutes. To this was added a 20% aqueous sodium nitrite solution (1 equivalent based on the amount of APSES) over 15 minutes. Heating and mixing was continued for a total of 3 hours. The contents of the mixer were removed by diluting with an additional 750 ml of DI water, and the resulting dispersion was then purified by diafiltration using DI water. At the end of the diafiltration (permeate conductivity <200 micro siemens) the concentration of pigment was adjusted to 15% and then centrifuged in a Carr Continuous Centrifuge (PilotFuge).

Alendronate sodium, 9.39 g (the monosodium salt of a 4-amino-1-hydroxybutane-1,1-diyl)bisphosphonic acid, commercially available from Zentiva, Prague, Czech Republic) was placed in a 2.5 L beaker. To this was added 37.56 g of DI water followed by 64.73 g of a 10% aqueous sodium hydroxide solution. The mixture was stirred until the solid had dissolved. Under vigorous mixing, 500 g of the treated PB 15:4 pigment from above (at 20% solids) was introduced by pumping at approximately 25 ml/min. After all of the dispersion had been added, the pH was measured to ensure a pH>12.5. Mixing was continued at 70° C. for 4 hours. The resulting dispersion was diluted to 5% solids and diafiltered with DI water until the permeate pH was <8 (after the first diafiltration volume the retentate was concentrated to 10% solids). The dispersion (adjusted to a solids concentration of approximately 13%) was then sonicated for 20 minutes using a Misonix probe sonicator, centrifuged using a Beckman Ultracentrifuge at 5000 G for 10 minutes to remove any large particles.

Each of dispersions E6 and B3 was formulated into two jettable ink compositions using the liquid vehicle of Table 2 to produce the inkjet inks having the solids content shown in Table 11 Ink compositions PB1(1) and PB1(2) were made from dispersion PB1 using the ink vehicle of Table 10 to produce the inkjet inks having the solids content shown in Table 11.

As shown in Table 9A, each of the experimental ink dispersions made using the procedure of Example 1 was easily filterable while control sample C4, made by adding a pre-prepared polyurethane polymer dispersion at an equivalent weight ratio, was not. Table 9B provides an inkjet print evaluation including optical density and smearfastness results for each of the inks Reliability is evaluated by one of skill in the art using the following scale:

Reliability Key

1—little or no defects

2—less than 25% defects

3—25%-50% defects

4—50%-75% defects

5—75%-100% defects

6—will not print

7—will not filter

TABLE 9A

| Sample | % Solids in dispersion | Polymer/ Pigment | % (polymer + pigment) dispersed in Ink | % Pigment in Ink | % Polymer in Ink | Filterability |
|---|---|---|---|---|---|---|
| B1 | 13.14 | 0.62 | 6 | 3.34 | 2.66 | Easy |
| B2 | 11.2 | 0.53 | 5.5 | 3.22 | 2.28 | Easy |
| E5 | 14.92 | 0.58 | 5.5 | 3.28 | 2.22 | Easy |
| Control C4 | 8.58 | n/a | 6 | 4 | 2 | Hard-4X |
| E6(1) | 14.41 | 0.38 | 6 | 4.1 | 1.9 | Easy |
| E6(2) | 14.41 | 0.38 | 5 | 3.4 | 1.6 | Easy |
| B3(1) | 14.89 | 0.38 | 6 | 3.8 | 2.2 | Easy |
| B3(2) | 14.89 | 0.38 | 5 | 3.2 | 1.8 | Easy |

TABLE 9B

| Sample | %(pigment + polymer) in ink | OD | 0 min HLS | HLS 5 min | HLS 1 hr | HLS 24 hr | Reliability |
|---|---|---|---|---|---|---|---|
| B1 | 6 | 1.46 | 0.065 | 0.01 | 0.015 | −0.005 | 2 |
| B2 | 5.5 | 1.49 | 0.045 | 0.01 | 0 | 0.03 | 2 |
| E5 | 5.5 | 1.46 | 0.03 | −0.005 | −0.01 | −0.01 | 3 |
| C4 | 6 | 0 | Did not print | Did not print | Did not print | Did not print | 7 |
| E6(1) | 6 | 1.52 | 0.295 | 0.055 | 0 | 0.04 | 1.5 |
| E6(2) | 5 | 1.52 | 0.165 | 0.145 | 0 | 0.045 | 1 |
| B3(1) | 6 | 1.55 | 0.365 | 0.13 | 0.03 | 0.055 | 1.5 |
| B3(2) | 5 | 1.53 | 0.235 | 0.105 | 0.055 | 0.05 | 1 |

TABLE 10

| Weight % | Material |
|---|---|
| 3.5 | Pigment |
| 6 | Methylene glycol monobutyl ether |
| 10 | Glycerin |
| 1 | Surfynol 465 |
| Balance | Water |

As shown in Table 11, each of these compositions, including color pigment PB1, provided an ink that was easily filterable with a high level of polyurethane polymer in the ink composition. "Treating agent" is the contribution of solids attributable to the bis-phosphonate treating agent used to modify the pigment.

TABLE 11

| Sample | % Solids | Polymer/ Pigment | Polymer/(Pig + Treating Agent) | % polymer + pigment in Ink | % Pigment in Ink | % Polymer in Ink | Filterability |
|---|---|---|---|---|---|---|---|
| E6(1) | 14.41 | 0.38 | 0.34 | 6 | 4.1 | 1.9 | easy |
| E6(2) | 14.41 | 0.38 | 0.34 | 5 | 3.4 | 1.6 | easy |
| B3(1) | 14.89 | 0.38 | 0.32 | 6 | 3.8 | 2.2 | easy |
| B3(2) | 14.89 | 0.38 | 0.32 | 5 | 3.2 | 1.8 | easy |
| PB1(1) | 19.67 | 0.41 | 0.35 | 3.5 | 2.2 | 0.9 | easy |
| PB1(2) | 19.67 | 0.41 | 0.35 | 5 | 3.1 | 1.9 | easy |

Optical density and smearfastness results for ink PB1(1) (cyan dispersion) are provided in Table 12. Images were printed using the same Canon ip4000 printer and process described previously and were printed on three different papers as provided in the table. These results illustrate good smear resistance with a jettable ink composition that includes a color pigment and a polyurethane polymer.

TABLE 12

| Paper Type | OD | 2 minutes | | 30 min | | 60 min | |
|---|---|---|---|---|---|---|---|
| | | Wet Smear | Dry Smear | Wet Smear | Dry Smear | Wet Smear | Dry Smear |
| Xerox 4200 | 1.01 | 0.19 | 0.11 | 0.20 | 0.12 | 0.16 | 0.09 |
| HPMP | 1.134 | 0.21 | 0.10 | 0.20 | 0.12 | 0.12 | 0.10 |
| X4200 + fixer | 1.176 | 0.18 | 0.14 | 0.20 | 0.13 | 0.18 | 0.10 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method comprising:
   mixing a polyurethane pre-polymer with a self-dispersed pigment to form a mixture;
   polymerizing the pre-polymer in the mixture to form a polyurethane polymer; and
   associating at least some of the polyurethane polymer with the dispersed pigment.

2. The method of claim 1 comprising adding the pigment in a dry form to a non-aqueous pre-polymer solution.

3. The method of claim 1 comprising mixing an aqueous dispersion of the pigment with a pre-polymer solution.

4. The method of claim 1 comprising removing a non-aqueous solvent from the mixture.

5. The method of claim 1 wherein at least some of the polyurethane polymer is unassociated with the pigment.

6. The method of claim 1 further comprising adding an ink vehicle to produce a thermal inkjet ink or a piezo inkjet ink.

7. The method of claim 1 comprising associating the polyurethane polymer to the self-dispersed pigment via at least one of ionic attachment, ion-ion, ion-H-bonding, ion-dipole, and H-bonding.

8. The method of claim 1 comprising producing both hydrophilic and hydrophobic polyurethane entities.

9. An inkjet composition comprising:
   an aqueous vehicle;
   a self-dispersed pigment; and
   a polyurethane polymer wherein at least 5 percent by weight of the polyurethane polymer is associated with the self-dispersed pigment and at least 5 percent by weight of the polyurethane polymer is unassociated with the self-dispersed pigment.

10. The composition of claim 9 wherein at least 10 percent of the polyurethane polymer is hydrophilic.

11. The inkjet composition of claim 9 wherein at least 10 percent by weight of the self-dispersed pigment is associated with the polyurethane polymer and at least 10 percent by weight of the self-dispersed pigment is unassociated with the polymer.

12. The inkjet composition of claim 9 comprising dispersed polyurethane particles and dissolved polyurethane molecules.

13. The inkjet composition of claim 9 wherein the self-dispersed pigment comprises an appended organic group.

14. The inkjet composition of claim 9 wherein the self-dispersed pigment comprises at least one geminal bisphosphonic acid group, or salt or ester thereof.

15. The inkjet composition of claim 9 wherein the pigment comprises carbon black.

16. The inkjet composition of claim 9 wherein the composition is a thermal inkjet composition.

* * * * *